(12) United States Patent
Smith et al.

(10) Patent No.: US 10,259,595 B2
(45) Date of Patent: Apr. 16, 2019

(54) ROOT END SPAR PLATE CLOSURE TOOL FOR BLADES

(71) Applicant: Sikorsky Aircraft Corporation, Stratford, CT (US)

(72) Inventors: Scott Oren Smith, Bedford, TX (US); David Littlejohn, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 242 days.

(21) Appl. No.: 15/275,915

(22) Filed: Sep. 26, 2016

(65) Prior Publication Data

US 2018/0086485 A1   Mar. 29, 2018

(51) Int. Cl.
| | |
|---|---|
| *B64F 5/10* | (2017.01) |
| *B64F 5/40* | (2017.01) |
| *B64C 27/473* | (2006.01) |
| *B64C 27/48* | (2006.01) |
| *B64C 11/04* | (2006.01) |
| *B25B 5/10* | (2006.01) |
| *B25B 5/14* | (2006.01) |

(52) U.S. Cl.
CPC ............... *B64F 5/10* (2017.01); *B64C 11/04* (2013.01); *B64C 27/473* (2013.01); *B64C 27/48* (2013.01); *B64F 5/40* (2017.01); *B25B 5/10* (2013.01); *B25B 5/14* (2013.01); *F05B 2230/80* (2013.01)

(58) Field of Classification Search
CPC .. Y10T 29/53848; Y10T 29/53857–29/53874; Y10T 29/53891; Y10T 29/53678; Y10T 29/53796; Y10T 29/37; Y10T 29/49318; Y10T 29/49332; Y10T 29/49336–29/49337; B25B 5/00; B25B 5/10; B25B 5/14; B25B 5/145; B64F 5/10; B23P 6/002–6/005; B23P 19/04; B23P 2700/01; B64C 11/04; B64C 27/48; F05B 2230/60; F05B 2230/80; F01D 5/005; F05D 2230/80
See application file for complete search history.

(56) References Cited

U.S. PATENT DOCUMENTS

| | | | | |
|---|---|---|---|---|
| 1,565,776 | A * | 12/1925 | Benedict | B21C 45/00 29/242 |
| 5,220,716 | A * | 6/1993 | Lostra | B25B 27/026 29/252 |
| 5,383,767 | A | 1/1995 | Aubry | |
| 5,862,576 | A | 1/1999 | Leahy et al. | |
| 7,434,328 | B2 | 10/2008 | Landino et al. | |
| 8,012,299 | B2 | 9/2011 | Hancock | |
| 8,409,389 | B2 | 4/2013 | Jones | |
| 8,713,776 | B2 * | 5/2014 | Herbold | F23R 3/002 29/256 |
| 8,800,126 | B2 * | 8/2014 | Shen | B25B 27/023 29/253 |
| 9,168,998 | B2 | 10/2015 | Moselage, III | |
| 9,511,488 | B2 * | 12/2016 | Andrews | B25B 27/023 |
| 9,920,748 | B2 * | 3/2018 | Nielsen | F03D 13/20 |

\* cited by examiner

*Primary Examiner* — Matthew P Travers
(74) *Attorney, Agent, or Firm* — Cantor Colburn LLP

(57) ABSTRACT

A root end spar plate closure tool includes a spar plate compression assembly for applying compressive force to a spar plate, a first flange extending from the spar plate compression assembly and including at least one pin opening, and a second flange extending from the spar plate compression assembly and including at least one pin opening. The first flange and the second flange define a blade root gap sized to receive a blade root.

13 Claims, 3 Drawing Sheets

ROOT END SPAR PLATE CLOSURE TOOL FOR BLADES

BACKGROUND

1. Field

The present disclosure relates to blades (e.g., for rotorcraft), more specifically to root end spar plate closure tools for blades.

2. Description of Related Art

During blade overhaul and repair root plate replacement is required if the cuff or laminates require replacement. Certain newer blade spars can include cuff-to-blade attachment bushings disposed in the blade spar. However, the existing production root plate closure tool will not work if cuff-to-blade attachment bushings are installed in the blade spar.

Such conventional methods and systems have generally been considered satisfactory for their intended purpose. However, there is still a need in the art for root end spar plate closure tools. The present disclosure provides a solution for this need.

SUMMARY

A root end spar plate closure tool includes a spar plate compression assembly for applying compressive force to a spar plate, a first flange extending from the spar plate compression assembly and including at least one pin opening, and a second flange extending from the spar plate compression assembly and including at least one pin opening. The first flange and the second flange define a blade root gap sized to receive a blade root.

The tool can further include at least one stepped pin sized to fit at least one step of each stepped pin through the pin openings and into the blade root gap. The stepped pins can be sized to insert into a blade hole with a bushing and a blade hole without a bushing. One or more of the stepped pins can be attached to at least one of the first flange, the second flange, or the spar plate compression assembly (e.g., via a wire).

In certain embodiments, the first flange can include a single pin hole. In certain embodiments, the second flange can include two or more pin holes. The second flange can include a view port defined therein.

The spar plate compression assembly can include an adjustable pressure plate moveably disposed between the first flange and the second flange relative to a frame plate. The first flange and the second flange can extend from the frame plate. In certain embodiments, the adjustable pressure plate can include a soft layer disposed thereon.

The spar plate compression assembly can include a plurality of torque screws for pushing against the adjustable pressure plate to apply compressive force to the spar plate. In certain embodiments, the adjustable pressure plate can be attached to one or more of the plurality of torque screws. Any other suitable attachment to the frame plate for sliding motion relative thereto is contemplated herein.

In certain embodiments, one or more of the torque screws can be movably disposed through screw holes defined in the frame plate. The screw holes in the frame plate can include threading. In certain embodiments, the frame plate includes symmetric extension flanges extending therefrom. A single torque screw can be disposed on each extension flange, for example.

A method can include inserting a blade root into a root end spar plate closure tool and inserting a stepped pin through the closure tool into a blade hole. The stepped pin can be inserted until it is at a step too large to be inserted further. The method can further include tightening torque screws on the closure tool to apply compression to a spar plate for bonding to blade root.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
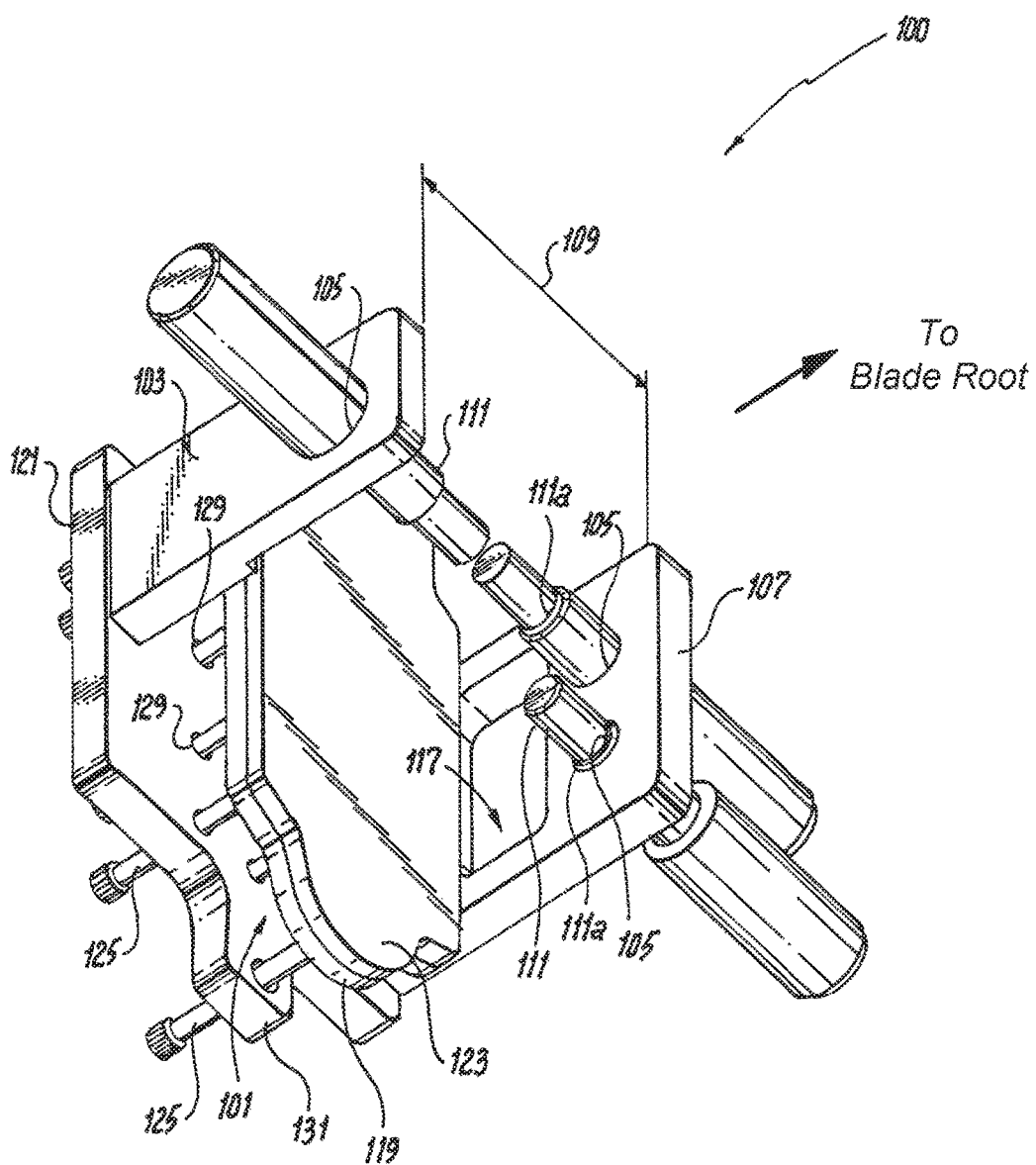
FIG. 1 is a perspective view of an embodiment of a tool in accordance with this disclosure, shown having stepped pins disposed therein.
Figure 2:
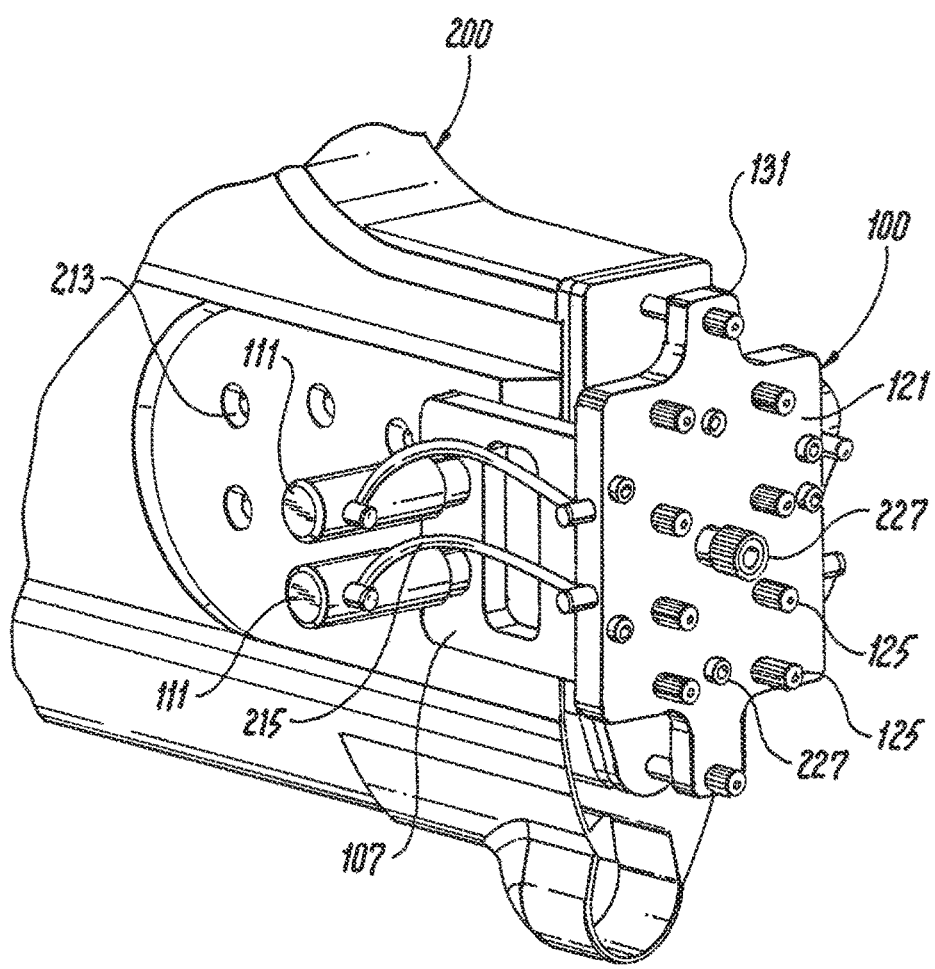
FIG. 2 is a perspective view of the tool of FIG. 1, shown disposed on a blade root.
Figure 3:
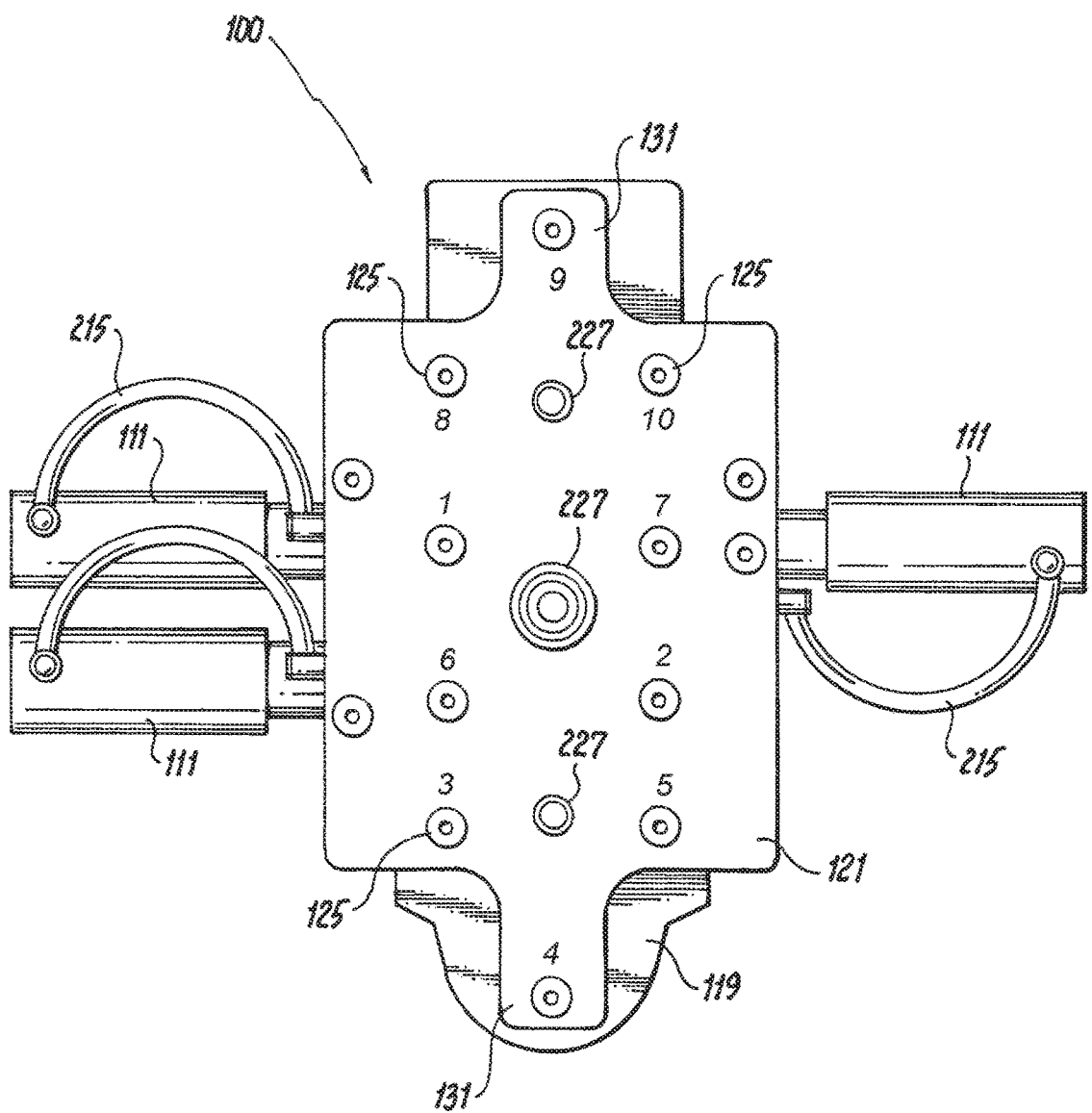
FIG. 3 is a plan view of the tool of FIG. 1, shown disposed on a blade root.

Reference will now be made to the drawings wherein like reference numerals identify similar structural features or aspects of the subject disclosure. For purposes of explanation and illustration, and not limitation, an illustrative view of an embodiment of a tool in accordance with the disclosure is shown in FIG. 1 and is designated generally by reference character 100. Other embodiments and/or aspects of this disclosure are shown in FIGS. 2 and 3. The systems and methods described herein can be used for root end spar plate closure and/or any other suitable purpose.

Referring to FIG. 1, a root end spar plate closure tool 100 includes a spar plate compression assembly 101 for applying compressive force to a spar plate (not shown). A first flange 103 extends from the spar plate compression assembly 101 and includes at least one pin opening 105. A second flange 107 extends from the spar plate compression assembly 101 and has at least one pin opening 105 as well. The first flange 103 and the second flange 107 define a blade root gap 109 therebetween that is sized to receive a blade root.

The tool 100 can further include at least one stepped pin 111 sized to fit at least one step 111*a* of each stepped pin through the pin openings 105 and into the blade root gap 109. Referring additionally to FIG. 2, the stepped pins 111 can be sized to insert into a blade hole 213 on the blade 200, regardless of whether the blade hole 213 includes a bushing. This can allow the tool 100 to be universally applied to any blade. In certain embodiments, one or more of the stepped pins 111 can be attached to at least one of the first flange 103, the second flange 107, or the spar plate compression assembly 101 (e.g., via a wire 215).

As shown, in certain embodiments, the first flange 103 can include a single pin hole 105. In certain embodiments, the second flange 107 can include two or more pin holes 105.

The second flange 107 can include a view port 117 defined therein, which can have any suitable dimensions.

In certain embodiments, the spar plate compression assembly 101 can include an adjustable pressure plate 119 (e.g., made of steel or any other suitable material) moveably disposed on a frame plate 121 between the first flange 103 and the second flange 107 relative to the frame plate 121. The first flange 103 and the second flange 107 can extend from the frame plate 121.

In certain embodiments, the adjustable pressure plate 119 can include a soft layer 123 (e.g., silicone, rubber, or any other suitable elastic material) disposed thereon. The adjustable pressure plate 119 can include any suitable thickness (e.g., about 0.25 inches).

Referring additionally to FIG. 3, the spar plate compression assembly 101 can include a plurality of torque screws 125 for pushing against the adjustable pressure plate 119 to apply compressive force to the spar plate. In certain embodiments, the adjustable pressure plate 119 can be attached to one or more of the plurality of torque screws 125 (e.g., via welding, adhesive, or any other suitable manner). The pressure plate 119 can be slidably attached to the frame plate 121 via one or more slider bolts 227 fixed to the pressure plate 119. Any other suitable attachment to the frame plate 121 for sliding motion relative thereto is contemplated herein.

In certain embodiments, one or more of the torque screws 125 can be movably disposed through screw holes 129 defined in the frame plate 121. The screw holes 129 in the frame plate 121 can include threading, for example (e.g., by being tapped or including a threading insert attached to the frame plate 121). In certain embodiments, the frame plate 121 can include symmetric extension flanges 131 extending therefrom. A single torque screw 125 can be disposed on each extension flange 131, for example.

A method can include inserting a blade root into a root end spar plate closure tool 100 and inserting a stepped pin 111 through the closure tool 100 into a blade hole 213. The stepped pin 111 can be inserted until it is at a step too large to be inserted further. The method can further include tightening torque screws 125 on the closure tool to apply compression to a spar plate for bonding to blade root. Tightening the torque screws 125 can include tightening the torque screws in a predetermined fashion (e.g., as shown numerically 1 through 10 in FIG. 3).

As described above, the tool 100 can be positioned and installed about the root end of the spar and pinned in location through the laminate cuff to blade attachment holes. The adjustable pressure plate 119 is then torqued to apply pressure for bonding the root closure. The shape of the frame plate 121 and/or pressure plate 119 can be the same as or similar to the root plate that is bonded to the end of the blade, for example, to evenly apply pressure. Embodiments as described above allow the tool to pin up even where cuff-to-blade bushings are installed in the laminate.

By way of example, aspects of the invention can be used in relation to coaxial helicopters, on tail rotors, or wings or propeller blades on fixed or tilt wing aircraft.

The methods and systems of the present disclosure, as described above and shown in the drawings, provide for root end spar plate closure tools with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A root end spar plate closure tool, comprising:
a spar plate compression assembly for applying compressive force to a spar plate;
a first flange extending from the spar plate compression assembly and including at least one pin opening;
and a second flange extending from the spar plate compression assembly and including at least one pin opening, wherein the first flange and the second flange define a blade root gap sized to receive a blade root, wherein the spar plate compression assembly includes an adjustable pressure plate moveably disposed between the first flange and the second flange relative to a frame plate including symmetric extension flanges extending therefrom, wherein a single torque screw is disposed on each extension flange, and wherein the first flange and the second flange extend from the frame plate, the spar plate compression assembly including a plurality of torque screws for pushing against the adjustable pressure plate to apply compressive force to the spar plate.

2. The tool of claim 1, comprising at least one stepped pin sized to fit at least one step of each stepped pin through the pin openings and into the blade root gap.

3. The tool of claim 2, wherein one or more of the stepped pins are attached to at least one of the first flange, the second flange, and the spar plate compression assembly.

4. The tool of claim 2, wherein the at least one stepped pin is sized to insert into a blade hole with a bushing and a blade hole without a bushing.

5. The tool of claim 1, wherein the adjustable pressure plate is attached to one or more of the plurality of torque screws.

6. The tool of claim 1, wherein one or more of the torque screws are movably disposed through screw holes defined in the frame plate.

7. The tool of claim 6, wherein the screw holes include threading.

8. The tool of claim 1, wherein the adjustable pressure plate includes a soft layer disposed thereon.

9. The tool of claim 1, wherein the first flange includes a single pin hole.

10. The tool of claim 1, wherein the second flange includes two or more pin holes.

11. The tool of claim 1, wherein the second flange includes a view port defined therein.

12. A method, comprising:
inserting a blade root into the root end spar plate closure tool of claim 1;
inserting a stepped pin through the closure tool into a blade hole, wherein the stepped pin is inserted until it is at a step too large to be inserted further.

13. The method of claim 12, further comprising tightening torque screws on the closure tool to apply compression to a spar plate for bonding to the blade root.

* * * * *